United States Patent [19]
Kojima et al.

[11] Patent Number: 5,456,330
[45] Date of Patent: Oct. 10, 1995

[54] RETURN-TO-NEUTRAL MECHANISM OF REAR WHEEL STEERING DEVICE

[75] Inventors: Fumio Kojima, Nagoya; Shuuetsu Suzuki, Anjo; Hideyasu Miyata, Nagoya; Yuuji Yokoya, Toyota; Masahiro Yonetani, Susono, all of Japan

[73] Assignee: Aisin Seiki Kabushiki Kaisha, Kariya, Japan

[21] Appl. No.: 129,329

[22] Filed: Sep. 30, 1993

[30] Foreign Application Priority Data

Sep. 30, 1992 [JP] Japan .................. 4-285298

[51] Int. Cl.⁶ ................. B62D 5/04; B62D 6/04
[52] U.S. Cl. .......... 180/79.1; 180/148; 180/154; 280/94; 74/89.15; 74/498; 267/150
[58] Field of Search .............. 180/79.1, 79.3, 180/140, 148, 151, 153, 154, 159, 160, 161, 79, 142, 163; 280/91, 94; 74/89.15, 498; 267/150

[56] References Cited

U.S. PATENT DOCUMENTS

| | | | |
|---|---|---|---|
| 4,669,567 | 6/1987 | Nakamura et al. | 180/140 |
| 5,086,863 | 2/1992 | Tischer | 180/140 |

FOREIGN PATENT DOCUMENTS

| | | |
|---|---|---|
| 1-161180 | 6/1989 | Japan . |
| 1-229769 | 9/1989 | Japan . |
| 1-229766 | 9/1989 | Japan . |
| 1-144278 | 10/1989 | Japan . |
| 1-144276 | 10/1989 | Japan . |
| 1-262265 | 10/1989 | Japan . |
| 2-88370 | 3/1990 | Japan . |
| 2-114061 | 4/1990 | Japan . |
| 2-136376 | 5/1990 | Japan . |
| 2-189276 | 7/1990 | Japan . |
| 3-61174 | 3/1991 | Japan . |
| 3-33778 | 4/1991 | Japan . |
| 3-33774 | 4/1991 | Japan . |
| 3-112784 | 5/1991 | Japan . |
| 3-96965 | 10/1991 | Japan . |
| 4-11778 | 1/1992 | Japan . |
| 4-43171 | 2/1992 | Japan . |
| 4-118377 | 4/1992 | Japan . |
| 4-59575 | 5/1992 | Japan . |

*Primary Examiner*—Richard M. Camby
*Assistant Examiner*—F. Zeender
*Attorney, Agent, or Firm*—Burns, Doane, Swecker & Mathis

[57] ABSTRACT

A return-m-neutral mechanism for a rear wheel steering device for an electronically controlled four wheel steering vehicle, in which a spring provided in the return-to-neutral mechanism does not come into operation within a predetermined steering angle range corresponding to the most frequent occurrences in actual application, thereby achieving energy saving and improving response characteristics. In the return-to-neutral mechanism for the rear wheel steering device for restoring the steered rear wheel to its neutral position under the biasing force of the spring, a dead zone corresponding to a predetermined steering angle of the rear wheels is provided for the spring.

3 Claims, 3 Drawing Sheets

RETURN-TO-NEUTRAL MECHANISM OF REAR WHEEL STEERING DEVICE

BACKGROUND OF THE INVENTION

1. Field of the Invention

This invention relates to a return-to-neutral mechanism for a rear wheel steering device. More particularly, it relates to a return-to-neutral mechanism for use in a rear wheel steering device of a vehicle a rear wheel of which is steered under a rotation drive force of an electric motor, such as a four wheel steering system (4WS) of a motor-car, for restoring a rear wheel, once steered, to its neutral position.

2. Related Art

In a vehicle, such as a motor vehicle, in which not only the front wheels but also the rear wheels are steered, there has been known a rear wheel steering device which is adapted to be actuated electro-magnetically by an electric motor or the like.

As the return-to-neutral mechanism for the four wheel steering system, there has so far been disclosed in e.g., JP Patent KOKAI Publication No. 1-161180 (1989) or JP Utility Model KOKAI Publication No. 3-33774 (1991) a return-to-neutral mechanism employing a biasing force of a spring means.

In such prior-art return-to-neutral mechanisms, the rear wheels are steered under the rotational driving force of the electric motor and are restored to or maintained at the neutral position by taking advantage of the force of reaction of a spring which is biased as the rear wheels are steered.

Discussions of the Related Art

However, with the above-described return-to-neutral mechanism, the spring is biased at all times even for a small steering angle range of the rear wheels which occurs frequently in a vehicle, especially a motor-vehicle. The result is an increased power consumption of the electric motor driving a rear wheel steering device and deteriorated response characteristics.

Besides, with the prior-art, the spring means is coupled to a steering rod for a rear wheel arranged downstream of the speed-reducing unit.

The result is that the return spring for restoring the rear wheel to its neutral position is required to develop a large biasing force and hence the spring has to be increased in size.

SUMMARY OF THE DISCLOSURE

It is therefore an object of the present invention, in its one aspect, to overcome the above deficiencies and provide a return-to-neutral mechanism of a rear wheel steering device in which spring means provided in the restoration system is not biased within a predetermined steering angle range, which is a frequently employed small angular range, for achieving energy saving and high response characteristics.

It is an object of a second aspect of the present invention to provide a return-to-neutral mechanism in which the return spring may be reduced in size and the rear wheel steering device may be reduced in size and weight.

In the first aspect of the present invention, there is provided a return-to-neutral mechanism for a rear wheel steering device for restoring a steered rear wheel to its neutral position under a biasing force of spring means, wherein, a dead zone corresponding to a predetermined steering angle of the rear wheel is provided for the spring means.

In the second aspect of the present invention, there is provided, for a rear wheel steering device for rotationally driving a rear wheel steering device, a speed reducing unit and a steering rod for steering driving of a rear wheel, a return-to-neutral mechanism for the rear wheel steering device, wherein the return-to-neutral mechanism for restoring the steered rear wheel to its neutral position under the bias of the spring means is connected to the electric motor arranged on the upstream side of the speed reducing unit.

According to the present invention, there is also provided a return-to-neutral mechanism comprising a casing having its one end secured to the electric motor driving the rear wheel steering device and its other the secured to a supporting member, a shaft having its one end connected to a rotation drive shaft of the electric motor and its other end rotatably supported by the supporting member and having screw flutes formed on its outer peripheral surface, a ball screw nut connected to the shaft via balls and having an axial guide groove formed on its outer peripheral surface, a rotation stop member having its one end secured to the casing and its other end retained in the guide groove, and being adapted for restraining rotation of said ball screw nut about an axis thereof, spring means for restoring a rear wheel to its neutral position, a plate secured to one end of the spring means and arranged facing an end face of the ball screw nut, and a snap ring for supporting the plate, wherein the ball screw nut is spaced apart from the plate at a neutral position corresponding to a neutral position of the rear wheel by a distance corresponding a predetermined steering angle.

With the first aspect of the present invention, by providing a predetermined dead zone for the return-to-neutral spring in association with a predetermined steering angle of the rear wheel corresponding to most frequent occurrence in actual application, the return-to-neutral spring is not acted upon within the steering angle range, with the result that the power consumption of the electric motor may be reduced and the motor load may be relieved to improve response characteristics of the rear wheel steering mechanism.

With the second aspect of the present invention, by connecting the return-to-neutral spring to the rotation drive shaft of the electric motor arranged upstream of the speed reducing unit having the high speed reduction ratio, the return-to-neutral spring may be reduced in size and weight to contribute to energy saving and reduction in size and weight of the rear wheel steering device.

Besides, with the return-to-neutral mechanism of the present invention, not only the energy saving may be achieved during travel within the steering angle range corresponding to most frequent occurrences, but also a fail safe function may be achieved in which, if malfunction of the motor system is incurred for the rear wheel steering angle in excess of a predetermined range, the return-to-neutral spring is activated for restoring the rear wheel to within a predetermined neutral safety range.

SUMMARY OF THE PREFERRED EMBODIMENT

With the first aspect of the present invention, by providing a predetermined dead zone for the return-to-neutral spring corresponding to a predetermined steering angle of the rear wheel corresponding in turn to a range of high use frequency, the return-to-neutral spring is not acted upon within the steering angle range for reducing the power consumption of the electric motor and improving response characteristics of the rear wheel steering device.

With the second aspect of the present invention, by connecting the return-to-neutral mechanism to the electric motor arranged upstream of the speed reducing device, the return-to-neutral spring may be reduced in size. In addition, a smaller rotational torque for the electric motor necessary in thrusting the spring in steering the rear wheels suffices to contribute to energy and reduction in size and weight of the rear wheel steering device.

Besides, according to the present invention, the screw 6 having screw flutes formed thereon constitutes the return-to-neutral mechanism which is adapted for being rotated in unison with the rotation drive shaft of the electric motor 20 adapted for rotationally driving the rear wheel steering device.

The axial guide groove 10 is formed on the outer peripheral surface of the ball screw nut 1 connected to shaft 6 via balls 7.

The ball screw nut is prohibited from being rotated about its axis by the rotation stop member 2, such as a rotation stop pin, having its one end secured to the casing and having its other end retained by the guide groove 10.

The rotational movement transmitted from the rotation drive shaft of the electric motor 20 to shaft 6 is transformed into a linear axial movement of the ball screw nut 1 by the so-called ball screw mechanism provided by the ball screw nut 1 and by the guide groove 10 formed in the rotation stop member 2 for retaining the rotation stop member the ball screw nut 1.

As the shaft 6 is rotated, such as in the forward direction, the ball screw nut 1 approaches the plate 4, provided at some distance apart from it. As the shaft 6 is rotated further in the forward direction, the ball screw nut 1 continues its linear axial movement further, until it thrusts the spring 3.

With the above-described return-to-neutral mechanism of the present invention, the predetermined distance T, provided between both axial end faces of the ball screw nut 1 and the plate 4 biased by the spring means so that the distance T corresponds to a predetermined steering angle, constitutes a dead zone for the return-to-neutral spring means when steering the rear wheel with the electric motor 20 as a driving source.

DETAILED DESCRIPTION OF THE PREFERRED EMBODIMENTS

Figure 1:
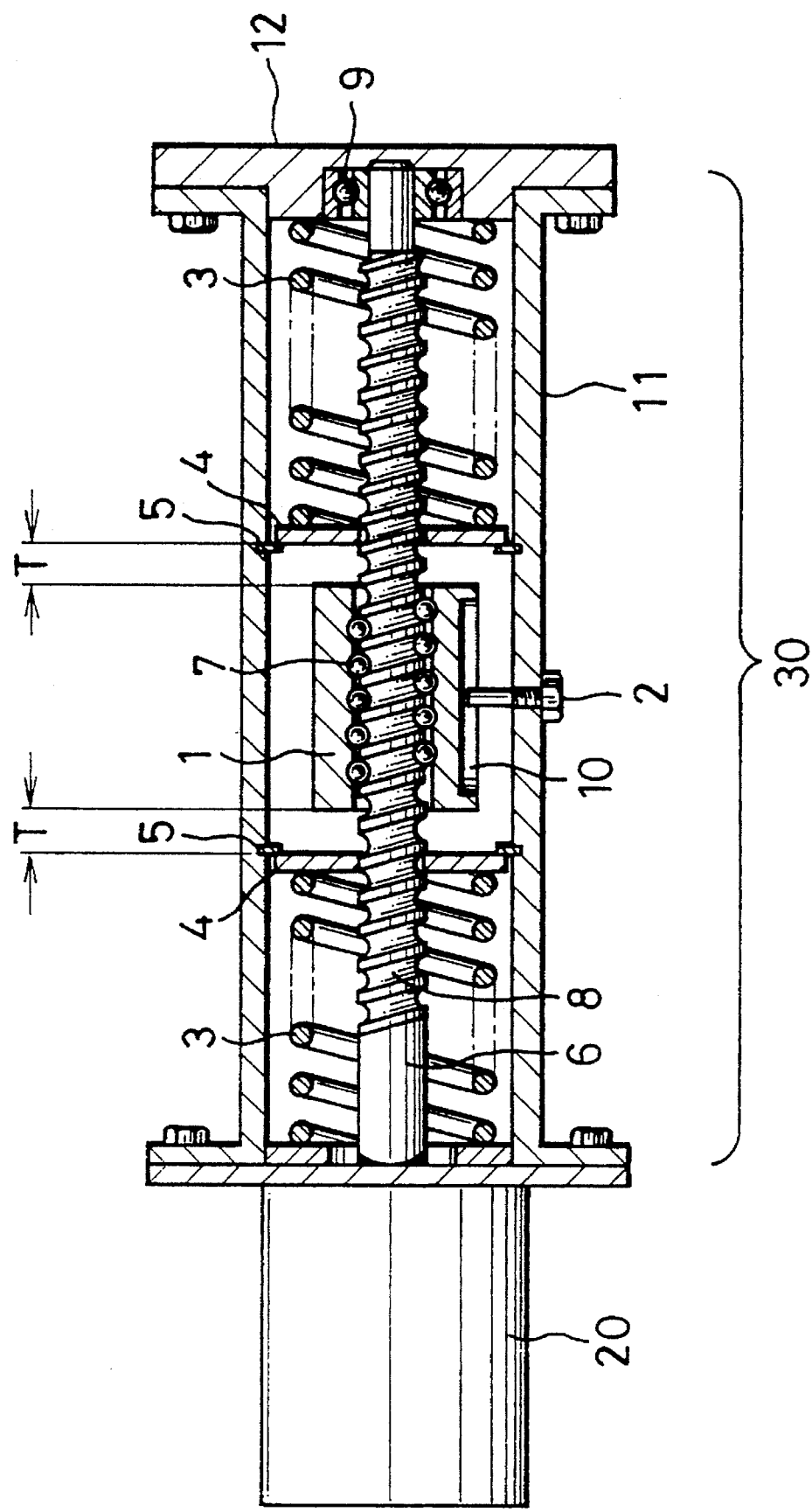
FIG. 1 is a cross-sectional view showing an embodiment of a return-to-neutral mechanism according to the present invention.

Referring to the drawings, an illustrative embodiment of the present invention will be explained in detail.

FIG. 1 shows, in a cross-sectional view, an embodiment of a return-to-neutral mechanism 30 according to the present invention.

A casing 11 has its one end secured to an electric motor and its other end supported by a supporting member 12.

A shaft 6 has its one end connected to a driving shaft of an electric motor 20 driving a rear wheel steering unit, for rotation in unison with the drive shaft, while having its other end rotatably supported by the supporting member 12 via a bearing 9.

A screw groove 8 is formed on the outer periphery of shaft 6 and a ball screw nut 1 provided for partially encircling the shaft 6 is connected to shaft 6 via plural balls 7.

The other peripheral surface of the ball screw nut 1 is formed with an axially extending guide groove 10 and a nut rotation stop member 2, such as a pin, has its one end introduced into guide groove 10. With the rotation stop member 2 threadedly attached to casing 11, rotation of ball screw nut 1 about its axis is inhibited, while axial movement thereof is permitted.

A spring 3 for resetting the rear wheel to its neutral position has its one end secured to the supporting member 12, while having its other end secured to a plate 4 mounted facing an end face of the ball screw nut 1.

Within the casing 11, a snap ring 5 is provided for supporting the plate 4, biased by spring 3, at the above-mentioned predetermined distance T.

When a rotary shaft of the electric motor 20 is rotated in a forward or reverse direction for steering the rear wheel away from its neutral position, shaft 8 is rotated in unison with the rotation of the driving shaft of the electric motor 20.

However, the ball screw nut 1, connected to shaft 8, is prohibited by the rotation stop member 2 from performing rotation about its own axis, such that rotation of shaft is transformed by a so-called ball screw mechanism into an axial linear movement of the ball screw nut 1 towards the left and right in the drawing.

To this end, the rotation stop member 2 has its one end retained in the axial guide groove 10 formed on the outer surface of the ball screw nut 1, with the guide groove 10 being slidable axially with respect to the rotation stop member 2, so that the ball screw nut 1 may be moved axially freely by the ball screw mechanism as a result of rotation of the shaft 6.

As long as the steering angle of the rear wheel with respect to the neutral position is within a predetermined small range, the ball screw nut 1, which has been displaced axially, is not as yet contacted with the plate 4, so that the return-to-neutral spring 3 is not actuated.

Therefore, as long as the rear wheel is within the predetermined steering angle, the rear wheel is steered back to its neutral position under the rotational driving force of the electric motor 20.

Once the steering angle with respect to the neutral position of the rear wheel exceeds the predetermined small range, the ball screw nut 1, which has been displaced axially, is brought for the first time into pressure contact with the plate 4 to thrust the return-to-neutral spring 3.

Since the amount of rotation of the driving shaft of the electric motor 20 is proportional to the steering angle of the rear wheel, the amount of axial movement of the ball screw nut 1 in the return-to-neutral mechanism of the present invention is proportional to the steering angle of the rear wheel, as will be explained subsequently.

The biasing force of the neutral restoration spring 3, which is thrust when the steering angle of the rear wheel exceeds a predetermined small range, is proportional to the amount of movement of the ball screw nut 1 less the predetermined distance T provided between the end faces of the ball screw nut 1 and the plate 4.

If the steering angle exceeds the predetermined small range, the biasing force of spring 3 in the thrust position is utilized in addition to the rotary driving force of the electric motor 20 for steering the rear wheel from is steered position to its neutral position.

Figure 2:
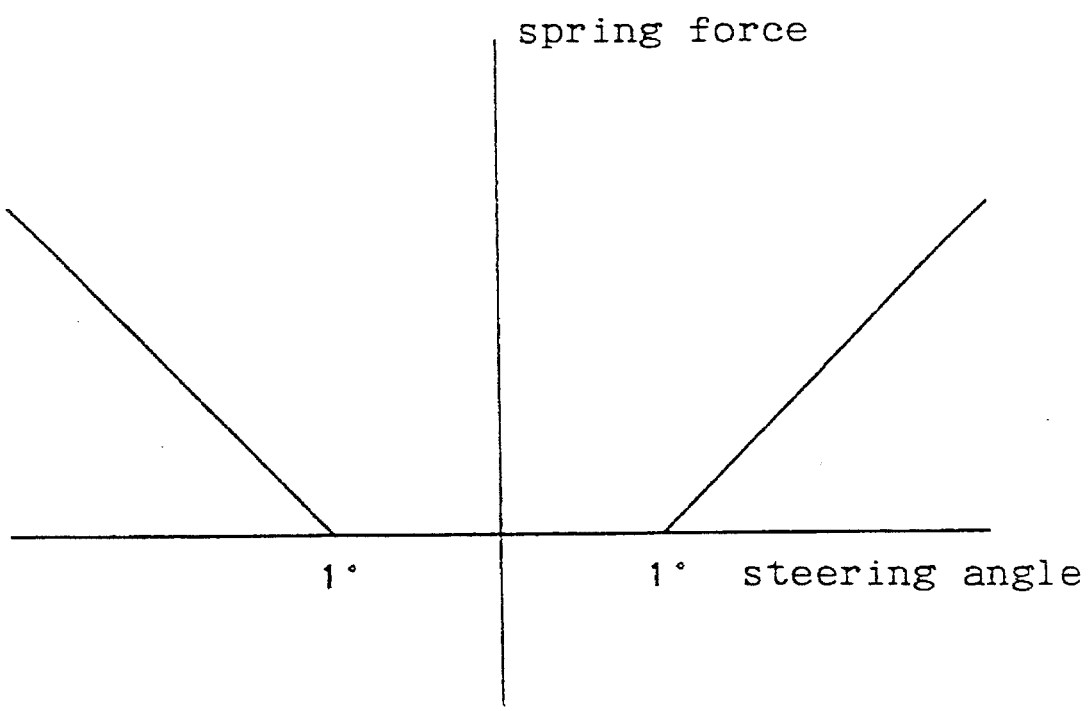
FIG. 2 is a graph showing the relation between the spring force of the return-to-neutral spring and the rear wheel steering angle according to the present invention.

The graph of FIG. 2 shows characteristics of the spring having a dead zone, according to the present invention, as plotted against the steering angle of the rear wheel.

As shown in this figure, the dead zone is set to 1° for the steering angle for the rear wheel in both the clockwise direction and the counterclockwise direction with respect to the neutral position.

The force of the spring, which is thrust when the steering angle of the rear wheel exceeds 1°, is changed in proportion to the steering angle of the rear wheel less 1° set as the dead zone as mentioned above.

The reason the dead zone is set is 1° is that the steering angle employed most frequently in a four wheel steering type vehicle is approximately 1°.

The dead zone of 1° of the steering angle is also based on the results of experiments that, if the rear wheel steering angle is a small angle of approximately 1° or less, safe running of the vehicle may be assured even upon the occurrence of troubles in the electric motor system during steering without the necessity of forced restoration to the neutral position by spring or the like.

If, with the rear wheel steering angle of 1° or more, a trouble should occur in the electric motor such that the rotation driving force of the motor is not produced, the ball screw nut 1 is thrust by spring 3 towards its neutral axial position, while shaft 6 is rotated by the ball screw mechanism in the direction opposite to the original direction for forcedly restoring the steered rear wheel to the steering angle 1° corresponding to the predetermined dead zone.

Figure 3:
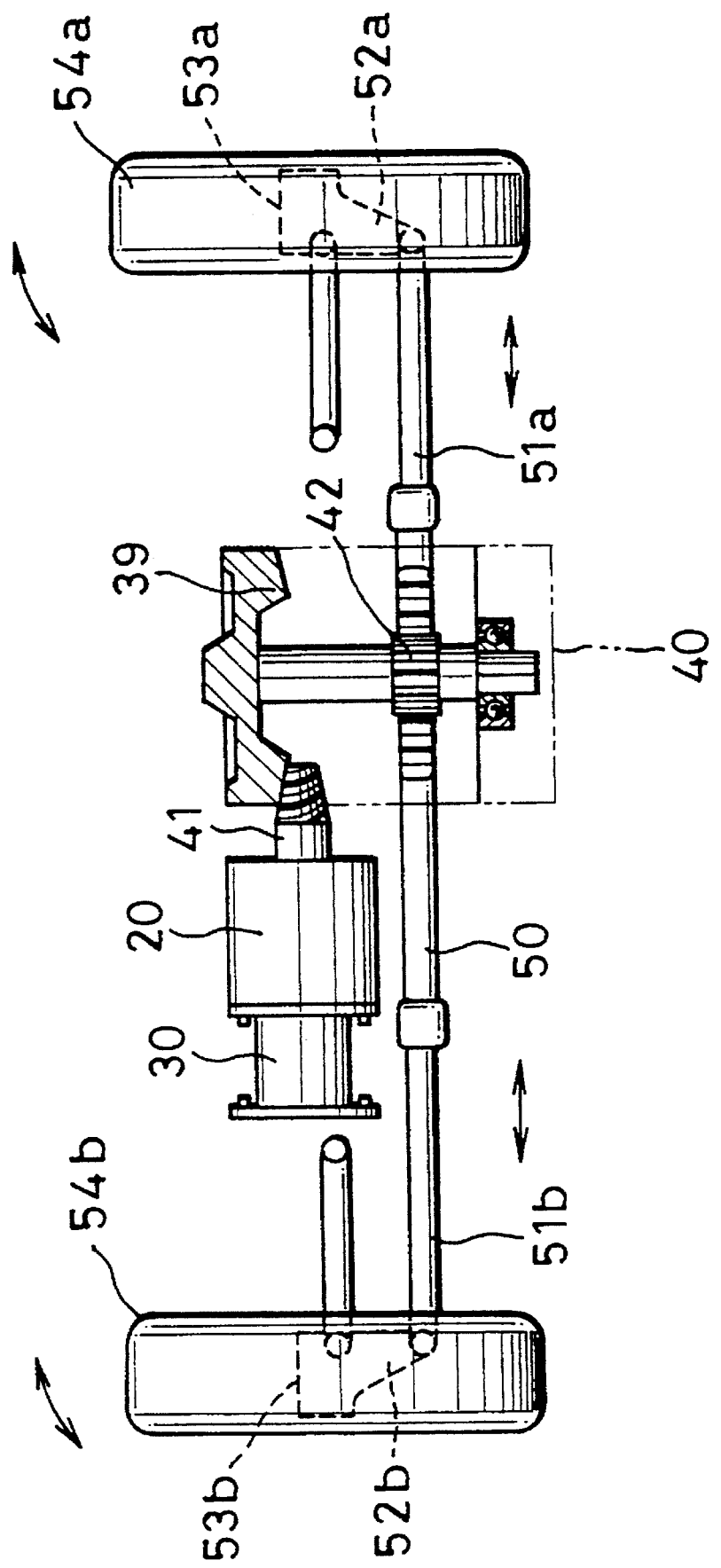
FIG. 3 is a schematic view showing an arrangement of a rear wheel steering device provided with the return-to-neutral mechanism of the present invention.

FIG. 3 shows a schematic construction of a rear wheel steering device provided with a return-to-neutral mechanism according to the present invention.

Referring to FIG. 3, illustrating a rear wheel steering mechanism comprised of an electric motor 20 for rotationally driving rear wheels, a speed reducing unit 40, connected to a rotational driving shaft of the motor, and an output rack shaft 50 for driving the rear wheels, a return-to-neutral mechanism 30 of the present invention is connected to the rotation drive shaft at a rear end of the electric motor 20.

The output rack shaft 50 is coupled to the speed reducing unit 40 via a rack-and-pinion device.

The speed reducing unit 40 is secured to a pinion shaft for rotation in unison with the pinion shaft. The speed reducing unit 40, having a high speed reducing ratio, is comprised of a pinion 41, formed at one end of a rotational driving shaft of the electric motor 20, a high speed-reducing ratio hypoid gear 39, meshing with pinion 41, and an output pinion 42 made fast with gear 39.

When the electric motor is rotated in the forward direction, the hypoid gear type pinion 41 of the speed reducing unit 40 and the output pinion 42 made fast with the pinion 41 are rotated in the forward direction to cause a forward travel of the output rack shaft 50. If the electric motor 20 is rotated in reverse, the hypoid gear type pinion 41 and the output pinion 42 made fast therewith are rotated in reverse to cause a backward travel of the output rack shaft 50. The amount of rotation of the rotation drive shaft of the electric motor is proportional to linear axial displacement of the output rack shaft 50.

Referring to FIG. 3, the output rack shaft 50 has its one end connected to a tie rod 51a and its other end connected to another tie rod 51b. If the output rack shaft 50 is driven linearly towards right in the drawing, the rods 51a, 51b are moved towards right and, as a result thereof, knuckle arms 52a, 52b connected to tie rods 51a, 51b are rotated counterclockwise in the drawing, so that rear wheels 54a, 54b connected to knuckles 53a, 53b are steered counterclockwise about a straight line perpendicular to the contact points with the ground.

In the above-described construction, the amount of rotation of the rotation drive shaft of the electric motor 20 is proportional to the amount of linear axial movement of the output rack shaft 50, with the amount of the movement of the output rack shaft 50 being proportional to the steering angle of the rear wheel.

Consequently, the amount of rotation of shaft 6 of the return-to-neutral mechanism 30 connected to the rotation drive shaft of the electric motor 20 is proportional to the steering angle of the rear wheel, while the axial linear displacement of the ball screw nut 1 is also proportional to the steering angle of the rear wheel.

Meanwhile, with the above-described rear wheel steering device, axial fluctuations transmitted from he rear wheel to the output rack shaft 50 are not transmitted to the upstream side motor 20 or speed reducing unit 40.

According to the present invention, since the shaft of the return-to-neutral mechanism 30 is coupled to the rotation drive shaft of the motor 20 arranged on the upstream side of the speed reducing unit 40 of the high speed reducing ratio, it suffices to set the force of the spring 3, required for restoring the steered rear wheel to its neutral position, so as to the equivalent at most to the rotational torque of the electric motor 20 coupled to the speed reducing unit 40, so that the spring 3 which is small-sized and lightweight suffices.

Besides, with the return-to-neutral mechanism 30 of the present invention, if the rear wheel is steered beyond a predetermined steering angle to cause the ball screw nut 1 to thrust the spring 3, a smaller amount of power consumption of the electric motor 20 suffices for thrusting the spring 3 inasmuch as a spring which is small-sized and lightweight and exhibits an extremely small spring constant as compared to that of the conventional return-to-neutral return spring connected to the steering rod is employed as spring 3.

What is claimed is:

1. In a rear wheel steering device, a return-to-neutral mechanism for restoring a steered rear wheel to a neutral position comprising spring means for exerting a biasing force to restore the steered rear wheel to the neutral position, said spring means including a dead zone corresponding to a predetermined steering angle of the rear wheel, a casing having one end secured to an electric motor which drives said rear wheel steering device and an opposite end secured to a supporting member, a shaft having one end connected to a drive shaft of said electric motor and an opposite end rotatably supported by said supporting member, said shaft having screw flutes formed on an outer peripheral surface thereof, a ball screw nut connected to said shaft via balls and having an axial guide groove formed on an outer peripheral surface thereof, said ball, screw nut having a longitudinal axis, a rotation stop member having one end secured to said casing and an opposite end retained in said guide groove, said rotation stop member restraining rotation of said ball screw nut about said longitudinal axis, a plate secured to one end of said spring means, said plate facing an end face of said ball screw nut, and a snap ring for supporting said plate, said ball screw nut being spaced apart from said plate, at a neutral position corresponding to the neutral position of the rear wheel, by a distance corresponding to the predetermined steering angle.

2. The return-to-neutral mechanism as defined in claim 1 wherein said predetermined steering angle is 1°.

3. The return-to-neutral mechanism as defined in claim 1 wherein a rotation amount of said shaft is proportional to the steering angle of the rear wheel.

* * * * *